Jan. 11, 1949.  W. A. BRUCE  2,458,829
APPARATUS FOR ADJUSTING THE ELECTRICAL
CONDITION OF ELECTRICAL ANALYZERS
Filed Aug. 11, 1945  3 Sheets-Sheet 1

INVENTOR.
William A. Bruce
BY
J D McKean
ATTORNEY.

Jan. 11, 1949.   W. A. BRUCE   2,458,829
APPARATUS FOR ADJUSTING THE ELECTRICAL
CONDITION OF ELECTRICAL ANALYZERS
Filed Aug. 11, 1945   3 Sheets-Sheet 2

INVENTOR.
William A. Bruce
BY
J. D. McKean
ATTORNEY.

Jan. 11, 1949.  W. A. BRUCE  2,458,829
APPARATUS FOR ADJUSTING THE ELECTRICAL
CONDITION OF ELECTRICAL ANALYZERS
Filed Aug. 11, 1945  3 Sheets-Sheet 3

INVENTOR.
William A. Bruce
BY
J D McKean
ATTORNEY.

Patented Jan. 11, 1949

2,458,829

UNITED STATES PATENT OFFICE 2,458,829

APPARATUS FOR ADJUSTING THE ELECTRICAL CONDITION OF ELECTRICAL ANALYZERS

William A. Bruce, Tulsa, Okla., assignor to Standard Oil Development Company, a corporation of Delaware Application August 11, 1945, Serial No. 610,352

2 Claims. (Cl. 201—48)

The present invention is directed to an apparatus adapted to be used with an electrical well analyzer to bring the electrical condition of the analyzer into conformity with the flow condition of the reservoir.

A device adapted for analyzing the behavior of natural reservoirs, and particularly petroleum reservoirs, by utilizing the analogy between a reservoir comprising a porous medium having ability both to store and to conduct the flow of liquid and an electrical circuit having ability both to store electrical charge and conduct electrical current, is disclosed in my patent application Serial No. 504,109, filed September 28, 1943, and issued as Patent No. 2,423,754, July 8, 1947. The device disclosed in my aforesaid application may be described briefly as involving an electrical network including condensers and resistances of such value that it will receive an electrical charge and dissipate it at a rate which is a function of the rate at which liquid is withdrawn from the porous continuum of the reservoir to be studied. In utilizing the network, the flow history of the reservoir being studied is simulated by supplying the network with an initial electrical potential which is analogous to the initial pressure of the reservoir, withdrawing current from the network at a rate analogous to the rate liquid was withdrawn from the reservoir and supplying additional current to the network at a rate analogous to the rate fluid flows into the reservoir. The time interval is conveniently altered from relatively long intervals, as of months and years, to a few seconds when the flow history of the reservoir has been reproduced by the electrical analogy in the network. It may be pointed out that rectangular coordinates may be employed for plotting a curve wherein the rate of production of fluid from the reservoir is the ordinate and the interval of time over which the rate of production occurs, the abscissa; by the application of a suitable conversion factor such a curve may be employed for reproducing the flow history of the reservoir in the electrical network and when so converted the rate of production in volumetric units is converted into capacitance. When the electrical condition of the analyzer is analogous to the flow condition of the reservoir, the effect on other reservoir factors, of a proposed rate of liquid withdrawal from the reservoir, may be studied by withdrawing current from the network at a rate analogous to the projected rate of liquid withdrawal.

It is an object of the present invention to provide an apparatus suitable for reproducing the flow history of a tapped subterranean reservoir in an electrical network to bring the electrical condition of the network into conformity with the flow condition of the reservoir.

More specifically, it is an object of the present invention to provide an apparatus for varying the rate of current withdrawal from an electrical network as a function of the rate of fluid withdrawal from a tapped subterranean reservoir.

Other objects and advantages of the present invention will be seen from the following descriptions taken from the drawing in which.

The device of the present invention may be described generally as involving a means for supplying an electrical potential to an electrical analyzer and wherein the magnitude of the electrical potential may be varied by the motion of a body and wherein means is provided for moving the body as a function of the fluid withdrawal rate from at least a portion of a tapped subterranean reservoir. The means for controlling movement of the element which varies the magnitude of the potential is a solid member commonly referred to as a template, or a plurality of templates, having one portion of the periphery shaped to conform with the production curve of a reservoir and means for moving the solid member at a uniform rate which bears a proportion to the time scale of the production curve of the member.

It has been found desirable in most reservoir studies to divide the reservoir into a number of areas, to prepare a separate template for each area, to fix the plurality of templates to a common member with the time scales of the production curves coinciding, and to move said plurality of fixed templates at a uniform rate which bears a fixed relationship with the time scale of the templates, and to utilize each separate template to vary the magnitude of a separate electrical potential, with the plurality of electrical potentials being electrically connected to the reservoir analyzer.

Figure 1:
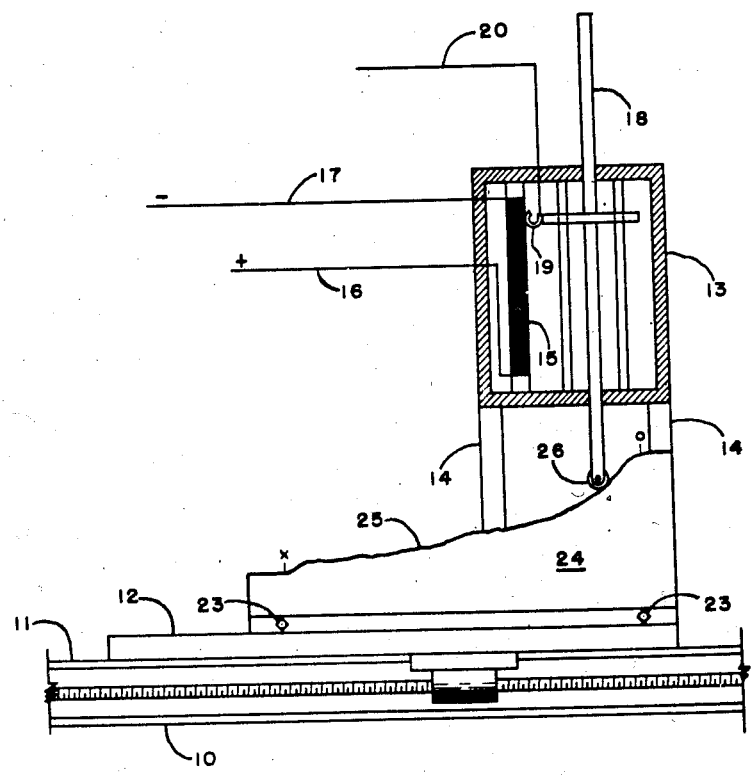
Fig. 1 is in the form of a simplified diagram illustrating an embodiment of the present invention.

In Fig. 1 is shown a simplified representation of an embodiment of the present invention. A base 10 defines a horizontally extending guideway or bed 11 and slidably arranged on the guideway is a carriage 12. A container 13 is secured to the base 10 by suitable means, such as brackets 14, which holds the container an appropriate distance above carriage 12. Mounted in the container is a resistance coil 15 which is electrically connected through leads 16 and 17 to a source of direct current which is not shown but which is indicated by the plus symbol adjacent lead 16 and a minus symbol adjacent lead 17. It will be seen that resistance 15 is in the form of a coil having a vertical axis. Also mounted within container 13 is an elongated member or rod 18 which is freely movable in a vertical direction. A contact member 19 is secured to rod 18 and is electrically connected through lead 20 to a suitable electrical network. As a specific example, but without intending to limit the application of the present invention, lead 20 may be connected to the control grid 22 shown in the drawing of my patent application Serial No. 504,109, filed September 28, 1943.

Secured to carriage 12 by suitable means, such as bolts 23, is a template 24 having its upper edge or boundary 25 shaped to conform with the production curve of a subterranean reservoir. The lower end of rod member 18 may be provided with a suitable means, such as a roller 26, for making contact with the boundary 25 of the template whereby contact member 19 is given a vertical motion which is a function of the ordinate of the curve defined by boundary 25. In utilizing the device of Fig. 1, in conjunction with the electrical reservoir analyzer of my application No. 504,109 aforesaid, carriage 12 must be given a uniform horizontal motion which bears a definite relationship to the abscissa of the curve defined by the boundary 25; such a means may be an electrical motor or similar mechanism but in order to simplify Fig. 1 a showing of such a means has been omitted therefrom.

Figure 3:
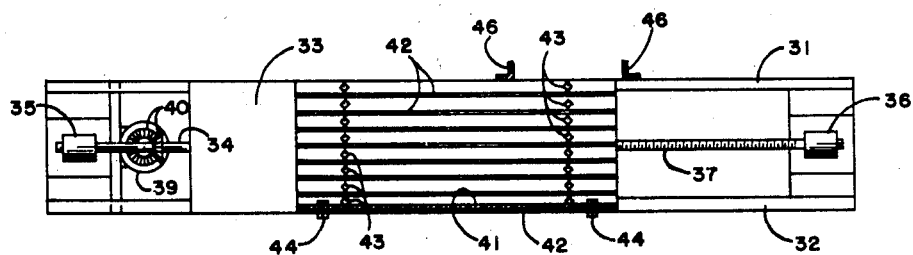
Fig. 3 is a view along line III—III of Fig. 2.
Figure 2:
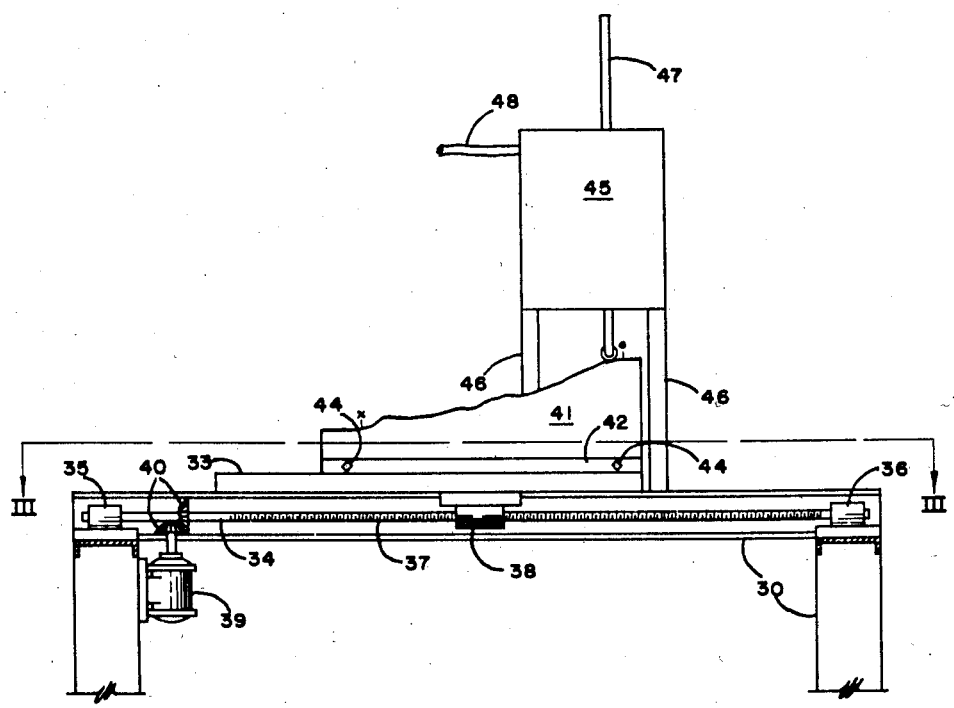
Fig. 2 is an elevation partly in section showing the mechanical construction of an embodiment of the present invention.

In commercial practice, it is usually desirable to analyze a reservoir by dividing it into a number of sections, plot a rate of production curve for each section and cut a corresponding template for each production curve of the family of curves. A device embodying the principles of that shown in Fig. 1 but arranged with means for employing a plurality of templates and reproducing the flow history of a reservoir is shown in Figs. 2 and 3. It will be seen that the device includes a frame 30 defining a horizontally extended bed which is made up of the two longitudinally extending members 31 and 32. A carriage 33 is arranged to cooperate with members 31 and 32 and is slidable along these members in a horizontal direction. Means for moving carriage 33 along the bed at a constant rate of speed is provided by the shaft 34 having its ends secured to stand 30 by bearings 35 and 36 and provided with a screw thread 37 which cooperates with a corresponding screw thread formed in projection 38 attached to carriage 33. A means for producing a uniform rotary motion, such as an electrical motor 39, is connected through gears 40 to shaft 34. It will be seen that shaft 34 is rotated at a uniform rate and in turn forces carriage 33 to move along its bed at a uniform rate.

Carriage 33 is provided with means for mounting a plurality of templates. In Figs. 2 and 3 a single template 41 is shown mounted on carriage 33. A means for mounting the template includes a longitudinally extending member 42 which has a section defining a right angle with a lower horizontally extending surface and a vertically extending surface. The horizontally extending surface of member 42 has its ends secured to carriage 33 by bolts 43; to the vertical extending portion by member 42 is secured the lower edge of template 41 by bolts 44. While only a single template and single member 42 is shown in Figs. 2 and 3, it would be seen that the carriage 33 is provided with two spaced rows of bolts 43, which in the embodiment shown may be used to attach eight templates to the carriage.

A housing or container 45 is secured by brackets 46 to frame 30 above the horizontally extending bed. Housing 45 has a width approximating that of carriage 33 and slidably mounted thereon for vertical movement is a plurality of contact members or rods 47; the number of rods is equal to the number of templates which may be mounted on carriage 33 with the lower end of each of the rods 47 arranged to contact with the upper surface of a corresponding template 41. While the interior of housing 45 is not shown it will be understood that it corresponds to container 13 of Fig. 1 and has within it a plurality of resistances, each of which corresponds to resistance 15 of Fig. 1 and connected to each resistance element is a contact corresponding to a contact member 19 of Fig. 1; the contacts are each electrically connected to conductors which are led from housing 45 through a suitable arrangement, such as cable 48. The number of resistance elements and contacts is equal to that of rods 47 with each rod connected to a separate contact member. A showing of the separate resistance elements and slidable elements within housing 45 has been omitted from the drawing in order to simplify the showing thereof. In Figs. 2 and 3 wherein means for attaching 8 templates to carriage 33 are provided 8 rod members 47 are similarly provided. The means for securing the templates to carriage 33 fixes the templates so that the corresponding time schedule of the production curve defined by the upper boundaries thereof coincide and, in like manner, rod members 47 are arranged in a line making a right angle to the path of motion of carriage 33; with this arrangement all the rods 47 for which templates are provided simultaneously occupy a position corresponding to a definite time period on the rate of production curve of the reservoir. In other words, the plurality of templates fixed to carriage 33 in contact with corresponding rod members 47 is moved along the bed or frame 30 at a uniform rate and converts the rate of the production curve of the reservoir being analyzed into an electrical value which bears a fixed relationship to the volumetric value employed when plotting the production curves defining the upper boundaries of templates 41.

It will be understood that the number of templates which may be mounted on a carriage 33 with corresponding rod members 47 limits only the maximum number of sections into which a reservoir may be divided when employing a given device and a smaller number of sections may be used by leaving unconnected the resistances within housing 45 which are to remain idle.

Figure 4:
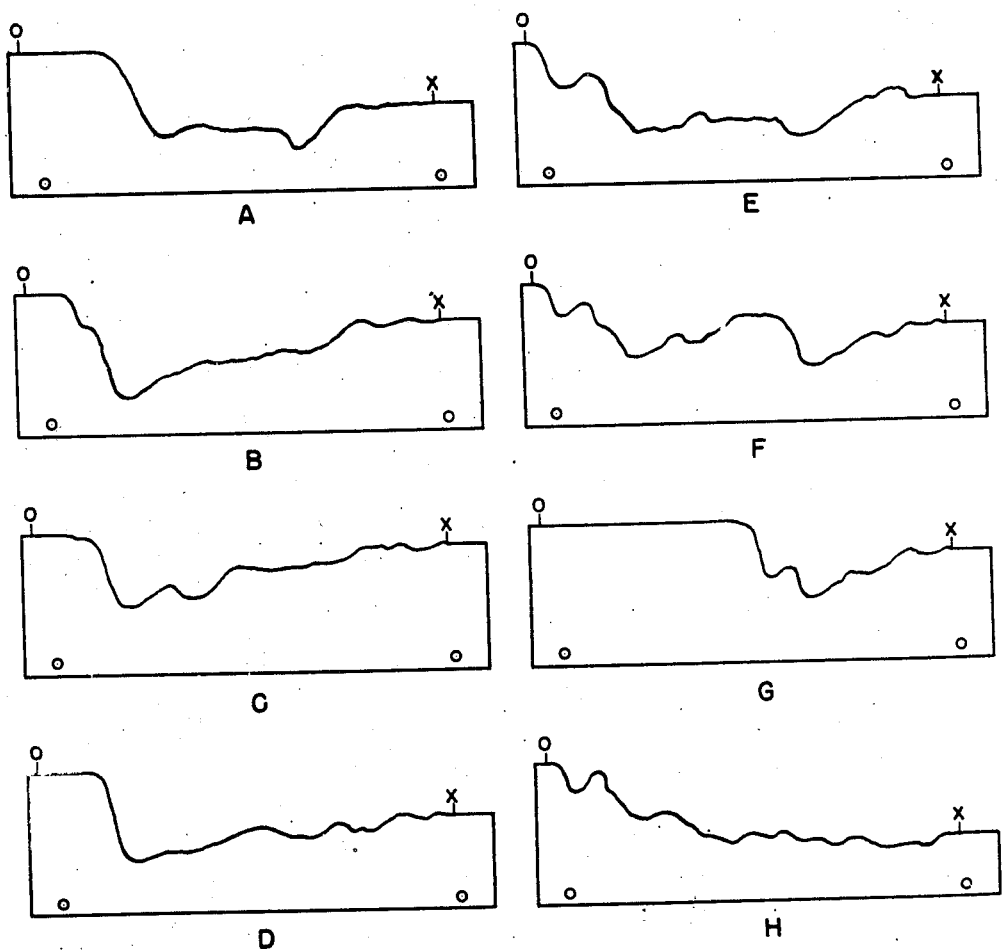
Fig. 4 is a view showing a typical group of templates which, taken together, reproduce the flow history of a subterranean reservoir and which are suitable for use with the device of Figs. 2 and 3.

A typical family of production curves representing the total production of a subsurface reservoir is shown in Fig. 4. In obtaining the curves, the reservoir being analyzed was divided into eight different portions and a rectilinear curve rate of production vs. time plotted for each section of the reservoir with the eight separate curves being plotted to the same scale. These curves are designated A, B, C, D, E, F, G and H on the drawing. It may be pointed out that for the convenience in the mechanical operation of the device the curves are inverted with respect to the usual practice, in other words, the downward movement of the curve indicates an increasing rate of production, while an upward movement indicates a decreasing rate of production. The point marked zero on each of the curves designates the time period at which the first producing well tapped the reservoir, while the point marked x on each curve indicates the date from which the future behavior of the reservoir is to be predicted.

In utilizing the family of curves shown on Fig. 4, the templates are fixed to carriage 33 and the carriage placed in its initial position with the lower ends of members 47 contacting the zero points of the production curves defined by the upper surfaces of the templates. Motor 39 is then started and moves carriage 33 to the right at a constant speed. The motor has previously been adjusted so that the speed at which it moves the carriage bears the proper relationship with the scale used in plotting the time interval on the curves and the electrical constants in the electrical analyzer (not shown) with which the source of potential in container 45 are connected. As carriage 33 moves to the right the members 47 follow the upper boundaries of the template whereby the position of members 47 are determined by the shapes of the production curves defined by the templates. When the carriage has moved the templates from O to x with respect to members 47, the electrical condition of the electrical reservoir analyzer is in conformity with the flow condition of the reservoir and movement of carriage 33 is terminated; a projected production scale may then feed into the analyzer as described in my patent application Serial No. 504,109 aforesaid.

While I have disclosed specific embodiments of the device of the present invention, it will be apparent to the workers skilled in the art that various changes may be made without departing from the scope of the invention. For example, while the templates shown in the drawings are provided with an upper surface shaped to conform with the production time curve of a reservoir, or with a portion of the reservoir, it will be evident that the periphery defining the surface may extend in a generally vertical direction if desired and the templates given a vertical motion. Similarly, while I have disclosed a specific arrangement for giving the carriage uniform motion and particular fastening means for securing the templates to the carriage various mechanical equivalents may be employed without departing from the scope of the invention.

Having fully described and illustrated the present invention, what I desire to claim as new and useful and to secure by Letters Patent is:

1. In a system for the electrical analysis of the behavior of a petroleum reservoir, including an electrical analyzer, an improved device for varying the electrical potential supplied to said analyzer which comprises a solid member having one portion of its periphery shaped to conform with the production time curve of a selected well tapping said reservoir, means for moving said solid member uniformly in a direction parallel with the time axis of said periphery, a follower adapted to ride on the aforesaid portion of said periphery, an electrical element of variable value adapted to effect electrical changes in said analyzer in accordance with projected changes in production of said selected well and means carried by said follower for varying the value of said electrical element in accordance with changes in said projected production.

2. In a system for the electrical analysis of the behavior of a petroleum reservoir, including an electrical analyzer, an improved device for varying the electrical potential supplied to said analyzer which comprises a base defining a bed, a carriage mounted on the base for movement along said bed, a plurality of solid members fixed to the carriage with each of said solid members having a portion of its boundary shaped to conform with the production curve of a portion of the reservoir, said curves being to the same scale, and the time axis of the curves defined by each of said boundaries parallel with the direction of the movement of the carriage along the bed, means for moving said carriage at a uniform rate along said bed, followers equal in number to the number of said solid members mounted on said base and slidable in a direction perpendicular to the direction of movement of the carriage along said bed, each follower being arranged to contact the boundary defining a production curve of a corresponding solid member, electrical elements of variable value equal in number to the number of solid members and adapted to effect electrical changes in the electrical reservoir analyzer and means carried by each of the followers for varying the value of a separate electrical element.

WILLIAM A. BRUCE.

REFERENCES CITED

The following references are of record in the file of this patent:

UNITED STATES PATENTS

| Number | Name | Date |
|---|---|---|
| 2,068,166 | Dodge | Jan. 19, 1937 |
| 2,366,968 | Kaufmann | Jan. 9, 1945 |